US007306039B2

(12) United States Patent
Wang et al.

(10) Patent No.: US 7,306,039 B2
(45) Date of Patent: Dec. 11, 2007

(54) METHODS OF USING CROSSLINKABLE COMPOSITIONS

(75) Inventors: Xiaolan Wang, Baton Rouge, LA (US); Paul H. Javora, Spring, TX (US)

(73) Assignee: BJ Services Company, Houston, TX (US)

( * ) Notice: Subject to any disclaimer, the term of this patent is extended or adjusted under 35 U.S.C. 154(b) by 179 days.

(21) Appl. No.: 10/641,909

(22) Filed: Aug. 13, 2003

(65) Prior Publication Data

US 2005/0038199 A1 Feb. 17, 2005

(51) Int. Cl.
*E21B 36/00* (2006.01)
*E21B 43/00* (2006.01)
*E21B 43/01* (2006.01)

(52) U.S. Cl. .................. 166/300; 166/57; 166/302; 166/367; 166/901; 507/90; 507/211; 507/226; 507/230; 507/266; 507/267; 507/271; 507/273; 507/903; 507/926

(58) Field of Classification Search ............... 524/47, 524/55; 507/110, 112, 113, 119, 120, 212, 507/90, 903, 211, 213–217, 224–226, 230, 507/261, 266, 267, 271, 273, 926; 166/57, 166/302, 901, 295, 300, 367, 45; 165/45
See application file for complete search history.

(56) References Cited

U.S. PATENT DOCUMENTS

| | | | |
|---|---|---|---|
| 3,058,909 A | 10/1962 | Kern et al. | |
| 3,301,723 A | 1/1967 | Chrisp et al. | |
| 3,444,279 A * | 5/1969 | Dost | 264/46.5 |
| 3,451,479 A * | 6/1969 | Parker | 166/303 |
| 3,456,735 A * | 7/1969 | McDougall et al. | 166/304 |
| 3,633,689 A * | 1/1972 | Christman | 175/65 |
| 3,722,591 A * | 3/1973 | Maxson | 166/295 |
| 3,827,978 A * | 8/1974 | Miles | 507/203 |
| 3,888,312 A | 6/1975 | Tiner et al. | |
| 3,953,335 A | 4/1976 | Jackson | |
| 4,258,791 A * | 3/1981 | Brandt et al. | 166/302 |
| 4,296,814 A * | 10/1981 | Stalder et al. | 166/303 |
| 4,330,414 A | 5/1982 | Hoover | |
| 4,553,601 A * | 11/1985 | Almond et al. | 166/308.5 |
| 4,649,999 A * | 3/1987 | Sandy et al. | 166/295 |
| 4,686,052 A | 8/1987 | Baranet et al. | |
| 4,730,674 A * | 3/1988 | Burdge et al. | 166/295 |
| 4,780,223 A | 10/1988 | Baranet et al. | |
| 4,797,216 A | 1/1989 | Hodge | |
| 4,799,962 A | 1/1989 | Ahmed | |
| 5,135,053 A * | 8/1992 | Lowther | 166/300 |
| 5,228,909 A | 7/1993 | Burdick et al. | |
| 5,236,046 A * | 8/1993 | Robison et al. | 166/270 |
| 5,547,026 A | 8/1996 | Brannon et al. | |
| 5,681,796 A | 10/1997 | Nimerick | |
| 5,785,747 A | 7/1998 | Vollmer et al. | |
| 5,806,597 A | 9/1998 | Tjon-Joe-Pin et al. | |
| 5,858,489 A * | 1/1999 | Beauquin | 428/36.5 |
| 5,972,850 A | 10/1999 | Nimerick | |
| 6,085,839 A * | 7/2000 | Wyant et al. | 166/292 |
| 6,103,671 A | 8/2000 | Dobson et al. | |
| 6,138,760 A | 10/2000 | Lopez et al. | |
| 6,218,343 B1 * | 4/2001 | Burts, Jr. | 507/225 |
| 6,342,467 B1 * | 1/2002 | Chang et al. | 507/110 |
| 6,489,270 B1 | 12/2002 | Vollmer et al. | |
| 6,632,779 B1 | 10/2003 | Vollmer et al. | |
| 6,746,992 B2 | 6/2004 | Kippie et al. | |
| 6,793,018 B2 | 9/2004 | Dawson et al. | |
| 6,810,959 B1 * | 11/2004 | Qu et al. | 166/300 |
| 6,908,886 B2 * | 6/2005 | Jones et al. | 507/112 |
| 2003/0166471 A1 * | 9/2003 | Samuel et al. | 507/200 |
| 2004/0011990 A1 * | 1/2004 | Dunaway et al. | 252/62 |
| 2004/0059054 A1 | 3/2004 | Lopez et al. | |
| 2004/0063587 A1 | 4/2004 | Horton et al. | |
| 2004/0152602 A1 | 8/2004 | Boles | |

FOREIGN PATENT DOCUMENTS

WO      WO 02/34809 A1      5/2002

OTHER PUBLICATIONS

Javora, et al., "Development and Application of Insulating Packer Fluids . . . ", Society of Petroleum Engineers, Inc., SPE 73729, Richardson, TX.
Dzialowski, et al., "The Development and Application of Environmentally . . . ", Society of Petroleum Engineers, Inc., SPE/IADC 79841, Amsterdam, The Netherlands.

* cited by examiner

*Primary Examiner*—George Suchfield
(74) *Attorney, Agent, or Firm*—Jones & Smith, LLP; John Wilson Jones

(57) ABSTRACT

A thermal insulating packer fluid contains water and/or brine, a crosslinkable viscosifying polymer, a crosslinking agent and an optional set retarder. The composition is capable of inhibiting unwanted heat loss from production tubing or uncontrolled heat transfer to outer annuli. The viscosity of the composition is such as to reduce the convection flow velocity within the annulus.

40 Claims, 2 Drawing Sheets

# METHODS OF USING CROSSLINKABLE COMPOSITIONS

FIELD OF THE INVENTION

This invention relates to enhancement of the thermal insulation of production tubing or a transfer pipe surrounding annuli by use of a novel thermal insulating composition. The composition contains water and/or brine, a crosslinkable viscosifying polymer, a crosslinking agent and an optional set retarder and/or solvent. The fluid viscosity of the composition is capable of reducing the convection flow velocity within the annulus of the well being treated.

BACKGROUND OF THE INVENTION

Undesired heat loss from production tubing as well as uncontrolled heat transfer to outer annuli can be detrimental to the mechanical integrity of outer annuli, cause productivity losses from the well due to deposition of paraffin and asphaltene materials, accelerate the formation of gas hydrates, and destabilize the permafrost in arctic type regions.

Early methods into controlling heat loss and enhancing oil recovery were focused on steam injection operations. For applications where the packer annulus was gas-filled, wellbore heat losses from refluxing annuli were found to be three to six times higher than anticipated for insulated tubing and only 30 to 40 percent less had the injection tubing not have been insulated.

Silicate foams were among the first insulating packer fluids. Such foams were employed in steam injection applications wherein a solution of sodium silicate was placed in a packed-off annulus, and then steam was injected down the tubing. The hot tubing caused the silicate solution to boil, leaving a coating of insulating material, silicate foam of ¼ to ½ inch thick, on the hot tubing surf ace. Silicate solution that remained in the annulus after steaming for several hours was removed from the annulus by displacing it with water which was removed by gas-lifting or swabbing. The foam insulator exhibited thermal conductivity of about 0.017 Btu/(hr·ft·° F.). However, difficulties were encountered in boiling off the solutions to form the foam. "Hot spots" were also observed to develop adjacent to the uninsulated couplings.

To prevent thermal refluxing, an insulating fluid that filled the entire annulus was chosen as an alternative to the gas filled annulus. Such fluids avoided unwanted heat loss as a result of reduced thermal conduction and/or convection. Oils, such as gelatinous oil based fluids exhibited relatively low thermal conductivity (0.08 Btu/(hr·ft·° F.). For instance, the relative thermal conductivity of this type of fluid was approximately 13 percent that of water. However, environmental restrictions limited the application of such oils. Furthermore, the long-term incompatibility with various elastomers presented concerns.

As an alternative to chemical methods, vacuum insulated tubing was proposed to solve the problem of paraffin deposition in the production tubing. While insulated tubing proved to be an effective method for wellbore insulation, actual heat losses were significant. Heat loss through couplings and other internal structures such as centralizers and valves were seen to account for up to 50 percent of the total heat loss. To fully achieve the potential of insulated tubing, selected rubber-insulated couplings were tested along with a thermal pipe coating. Although improved thermal performance was obtained, maintaining the annulus dry over a long period was difficult, and, heat loss through refluxing could still occur because of damaged and scraped coating, and downhole centralizers, valves and gauges. Furthermore, the cost of vacuum insulated tubing can be prohibitive for many projects.

It was found that such problems could be controlled effectively by the use of specially designed aqueous-based (oil-free) insulating packer fluids. Such fluids were found to secure the insulation of the wellbore and to reduce the amount of heat transfer from the production tubing to the surrounding wellbore, internal annuli, and riser. Conventional packer fluids, such as clear brines under natural convection, were found to transfer heat by a factor of 10 to 20 over molecular conduction. Free convection is fluid motion caused by the variation of fluid density with temperature. Increasing fluid viscosity decreases fluid motion, and correspondingly, decreases free annular convection.

Thus, the desired rheological profile for an insulating fluid began to include high viscosity properties at low shear rate in order to reduce the free fluid convection caused by temperature differential. Additionally, a low viscosity at high shear rate is desired to facilitate the placement of the insulating fluid at the desired location. Specific rheological properties were selected based on the specific well application.

Exemplary of such aqueous based insulating fluids are the non-crosslinked insulating fluids disclosed in U.S. Pat. No. 6,489,270, herein incorporated by reference. Such aqueous based insulating fluids proved to be solids-free, non-damaging, environmentally friendly, and highly insulating. Their fluid viscosity made it easy to blend and pump them into the annulus; their fluid density being controlled by the amount and type of dissolved salt needed to provide positive control of the wellbore pressure without the risk of solid settling and separation.

Such fluids, when added either into an annulus or riser, effectively reduced undesired heat loss from the production tubing, or heat transfer to outer annuli. In some cases, heat loss from the produced fluids due to conduction and convection can be reduced by more than 90% when compared with conventional packer fluids. Fluids having improved insulation properties have been sought.

SUMMARY OF THE INVENTION

The invention relates to a thermal insulating composition capable of controlling the heat transfer from a production tubing or transfer pipe to one or more surrounding annuli and the environment. The composition, which exhibits enhanced thermal control and which is particularly effective for deepwater risers, contains, along with water and/or brine, a crosslinkable viscosifying polymer and a crosslinking agent. Such compositions provide high viscosity at low shear rate range to reduce convection flow velocity within the annulus.

The improved insulation, evidenced by the insulating compositions of the invention, is achieved by crosslinking the viscosifying polymer in the water and/or brine. Through crosslinking, a polymer network is formed such that the aqueous composition becomes immobilized. The immobilization of the composition significantly reduces convection velocity since convection is achieved through the movement of water and/or other aqueous solvents.

BRIEF DESCRIPTION OF THE DRAWINGS

In order to more fully understand the drawings referred to in the detailed description of the present invention, a brief description of each drawing is presented, in which.

DETAILED DESCRIPTION OF THE PREFERRED EMBODIMENTS

Figure 1:
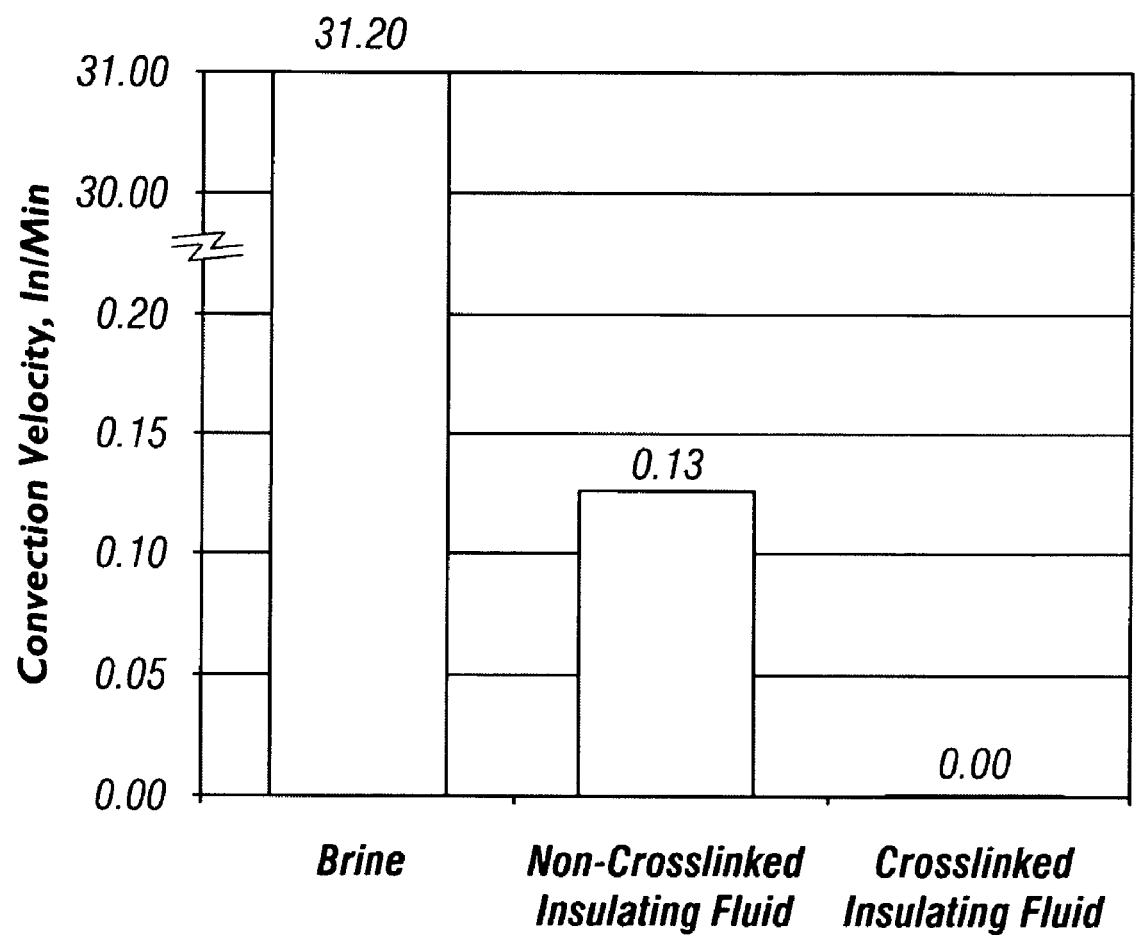
FIG. 1 illustrates the convection rates exhibited by a crosslinked insulating fluid versus non-crosslinked insulating fluids of the prior art as well as brine per se, as discussed below in Example 6.

The thermal insulating composition of the invention contains (a) water and/or brine; (b) a crosslinkable viscosifying polymer; and (c) a crosslinking agent. The composition further may optionally include a set retarder. The viscosity of the composition is sufficient to reduce the convection flow velocity within the annulus and immobilize the water and/or brine. A convection velocity less than 0.005 in/min for the crosslinked insulating composition vs. 0.25 in/min for the non-crosslinked insulating composition of the prior art has been observed.

Increased viscosity due to crosslinking further significantly reduces thermal convection. The composition, when pumped into an annuli surrounding the production tubing or transfer piping, enhances the thermal insulating quality around the tubing or piping, thereby reducing heat loss from it. The composition further provides high viscosity at low shear rate so as to reduce the rate of fluid convection to near zero.

Preferably, the thermal insulating composition of the invention contains from about 20 to about 99 weight percent water or brine. The brine may be saturated or unsaturated brine. By saturated brine, it is understood that the brine is saturated with at least one salt. The viscosifying polymer and crosslinking agent and, when desired, polyol and/or set retarder, are typically added to the water and/or brine. In a preferred embodiment, the viscosifying polymer is added to the polyol which is then mixed with the aqueous brine. When the set retarder is employed, it is preferred to add the set retarder to the blend prior to introduction of the crosslinking agent but after introduction of the viscosifying polymer. In one embodiment of the present invention, the fluid is substantially free of water.

Suitable viscosifying polymers are those which are crosslinkable and preferably include polysaccharides, anionic as well as nonionic, such as guar gums and derivatives, cellulose, starch, and galactomannan gums as well as polyvinyl alcohols, polyacrylates, polypyrrolidones and polyacrylamides and mixtures thereof. In addition, the crosslinkable viscosifying polymer of the invention may be a block or random copolymer containing units selected from vinyl alcohol, acrylates, including the (meth)acrylates, pyrrolidone, 2-acrylamido-2-methylpropane sulfonate and acrylamide including the (meth)acrylamides.

Cellulose and cellulose derivatives include alkylcellulose, hydroxyalkyl cellulose or alkylhydroxyalkyl cellulose, carboxyalkyl cellulose derivatives such as methyl cellulose, hydroxyethyl cellulose, hydroxypropyl cellulose, hydroxybutyl cellulose, hydroxyethylmethyl cellulose, hydroxypropylmethyl cellulose, hydroxylbutylmethyl cellulose, methylhydroxyethyl cellulose, methylhydroxypropyl cellulose, ethylhydroxyethyl cellulose, carboxyethylecellulose, carboxymethylcellulose and carboxymethylhydroxyethyl cellulose. The polysaccharides also include microbial polysaccharides such as xanthan, succinoglycan and scleroglucan as well as galactomannan gums and derivatized galactomannan gums.

Specific examples of polysaccharides useful with the present invention include but are not limited to guar gum, hydroxypropyl guar, carboxymethylhydroxypropyl guar and known derivatives of these gums.

The viscosifying polymer is typically present in the thermal insulating composition at a range between from about 0.1 to about 5, preferably from about 1 to about 3, weight percent. The viscosifier is included in the present invention to provide a fluid having a viscosity sufficient to reduce the convection flow velocity within the annulus. The composition of the invention may further include a polyol as a solvent. Such solvents are of assistance in keeping the crosslinkable viscosifying polymer dispersed in the composition and to prevent it from decomposing while being subjected to the extreme conditions offered by deep wellbores. In addition, the polyol serves to reduce the thermal conductivity of the composition and thus imparts thermal insulation to the composition. In a preferred embodiment, the viscosifying polymer is introduced to the polyol and the resulting slurry is then added to the brine and the crosslinking agent and, if present, set retarder.

The viscosifier for use in the composition of the invention may include clay and clay-like materials which further impart viscosity to the composition. Such materials may be used in addition to the viscosifying agents referenced above. The polyol solvent, in such circumstances, is compatible with such materials.

The polyol is preferably glycerol, a glycol or a polyglycols and mixtures thereof. The glycols include commonly known glycols such as ethylene glycol, propylene glycol and butylene glycol. The polyglycols can be selected from a wide range of known polymeric polyols that include polyethylene glycol, poly(1,3-propanediol), poly(1,2-propanediol), poly(1,2-butanediol), poly(1,3-butanediol), poly(1,4-butanediol), poly(2,3-butanediol), co-polymers, block polymers and mixtures of these polymers. A wide variety of polyglycols is commercially available. Most commercially available polyglycols include polyethylene glycol, and are usually designated by a number that roughly corresponds to the average molecular weight. Examples of useful commercially available polyethylene glycols include polyethylene glycol 4000 and polyethylene glycol 6000. Preferably the polymeric polyols for use in the present invention are selected to have a number average molecular weight, $M_n$, of about 150 to about 18,000 Daltons. More preferably, the polymeric polyols are selected to have number average molecular weight of about 190 to about 10,000 D. Yet most preferably, the polymeric polyols are selected to have number average molecular weight of about 500 to about 8,000 D. When present, the composition of the invention will typically contain between from about 10 to about 80 wt % of polyol.

Use of polyglycols having the described number average molecular weight in the present invention provide a fluid that exhibits stable rheological properties especially at elevated temperatures and over extended periods of time These polyglycols are particularly well suited for deep wellbores that exert high temperature and pressures on fluids.

The thermal insulating compositions of the invention further contain a crosslinking metal-releasing agent. As used herein, the term "crosslinking metal-releasing agent" is taken to designate those metal or metal containing materials which will provide a metal ion or metal containing species in the solution capable of crosslinking the viscosifying polymer.

The crosslinking agent preferably comprises a borate ion releasing compound, an organometallic or organic complexed metal ion comprising at least one transition metal or alkaline earth metal ion as well as mixtures thereof. Typically, the crosslinking agent is employed in the composition in a concentration of from about 0.001 percent to about 2 percent, preferably from about 0.005 percent to about 1.5 percent, and, most preferably, from about 0.01 percent to about 1.0 percent.

Borate ion releasing compounds which can be employed include, for example, any boron compound which will supply borate ions in the composition, for example, boric acid, alkali metal borates such as sodium diborate, potassium tetraborate, sodium tetraborate (borax), pentaborates and the like and alkaline and zinc metal borates. Such borate ion releasing compounds are disclosed in U.S. Pat. No. 3,058,909 and U.S. Pat. No. 3,974,077 herein incorporated by reference. In addition, such borate ion releasing compounds include boric oxide (such as selected from $H_3BO_3$ and $B_2O_3$) and polymeric borate compounds. An example of a suitable polymeric borate compound is a polymeric compound of boric acid and an alkali borate which is commercially available under the trademark POLYBOR® from U.S. Borax of Valencia, Calif. Mixtures of any of the referenced borate ion releasing compounds may further be employed. Such borate-releasers typically require a basic pH (e.g., 7.0 to 12) for crosslinking to occur.

Further preferred crosslinking agents are reagents, such as organometallic and organic complexed metal compounds, which can supply zirconium IV ions such as, for example, zirconium lactate, zirconium lactate triethanolamine, zirconium carbonate, zirconium acetylacetonate and zirconium diisopropylamine lactate; as well as compounds that can supply titanium IV ions such as, for example, titanium ammonium lactate, titanium triethanolamine, and titanium acetylacetonate. Zr (IV) and Ti (IV) may further be added directly as ions or oxy ions into the composition.

Such organometallic and organic complexed metal crosslinking agents containing titanium or zirconium in a +4 valence state include those disclosed in British Pat. No. 2,108,122, herein incorporated herein by reference, which are prepared by reacting zirconium tetraalkoxides with alkanolamines under essentially anhydrous conditions. Other zirconium and titanium crosslinking agents are described, for example, in U.S. Pat. No. 3,888,312; U.S. Pat. No. 3,301,723; U.S. Pat. No. 4,460,751; U.S. Pat. No. 4,477,360; Europe Pat. No. 92,755; and U.S. Pat. No. 4,780,223, all of which are herein incorporated by reference. Such organometallic and organic complexed metal crosslinking agents containing titanium or zirconium in a +4 oxidation valance state may contain one or more alkanolamine ligands such as ethanolamine (mono-, di- or triethanolamine) ligands, such as bis(triethanolamine)bis(isopropol)-titanium (IV). Further, the compounds may be supplied as inorganic oxides, such as zirconium or titanium dioxide. Such crosslinking agents are typically used at a pH also in the range from about 6 to about 13.

Any suitable crosslinking metal ion, metal containing species, or mixture of such ions and species may further be employed. In a preferred embodiment, the crosslinking agent for use in the thermal insulating composition of the invention are reagents capable of providing Zn (II), calcium, magnesium, aluminum, Fe (II), and Fe (III) to the composition. These may be applied directly to the composition as ions or as polyvalent metallic compounds such as hydroxides and chlorides from which the ions may be released.

The crosslinking ions or species may be provided, as indicated, by dissolving into the solution compounds containing the appropriate metals or the metal ion per se. The concentration of crosslinking agent is dependent on factors such as the temperature in the annuli and will normally range from about 5 ppm to about 2000 ppm, preferably from about 100 ppm to about 900 ppm. It is an important advantage of the invention that higher levels of the crosslinking metal ion or metal containing species may be employed, thereby insuring improved crosslinking.

Crosslinking typically occurs after the thermal insulating composition is within the annuli The crosslinkable thermal insulating composition of the invention is prepared on the surface and then pumped through tubing in the wellbore or in the annulus. In a preferred embodiment, the fluid is a packer or riser fluid and the packer fluid is introduced above the packer in an annulus and the riser fluid is introduced into a riser annulus.

Zirconium crosslinkers, such as those described in British Pat. No. 2,108,122, are a preferred class of crosslinkers for use herein. Such crosslinkers are preferred because of their "delayed" or "retarded" crosslinking reactivity. This delayed activity is useful because it lets the operator formulate and pump the uncrosslinked composition while it has a relatively lower viscosity which means easier pumping. The delayed systems are usually designed to crosslink while the fluid is being pumped through the wellbore tubing and/or as the fluid enters into the annuli.

While high viscosity, thickened fluid is highly desirable after the fluid is positioned in the annulus, large amounts of energy are required to pump such fluids through tubing and annular spaces. The delayed crosslinking embodied by the composition of the invention reduces the amount of energy required to pump viscous fluids through the tubing since it permits pumping of a relatively less viscous fluid having relatively low friction pressures within the well tubing. Crosslinking is typically effected when the fluid is placed in the annulus after which the advantageous properties of thickened crosslinked fluid are then available for thermal insulation.

The thermal insulating composition of the invention may actually contain a set retarder to prevent crosslinking prior to the composition being pumped into the annuli. The set retarder is present in an amount sufficient to prevent such crosslinking, typically from 0 to about 4, preferably from about 0.1 to about 2, weight percent.

Suitable set retarders include glucoheptonates, such as sodium glucoheptonate, calcium glucoheptonate and magnesium glucoheptonate; lignin, lignin sulfonates, such as sodium lignosulfonate and calcium lignosulfonate; gluconates, such as sodium gluconate, calcium gluconate and calcium sodium gluconate; phosphonates, such as the sodium salt of EDTA phosphonic acid; sugars, such as sucrose; hydroxycarboxylic acids, such as citric acid; and the like, as well as their blends. In a preferred embodiment, the set retarder is an allitol, altritol, arabinitol, dulcitol, iditol, mannitol, perseitol, ribitol, rythritol, sorbitol, threitol or xylitol.

The thermal insulating compositions should be approached on a specific project basis to meet a target objective in terms of viscosity and density. Density is normally dictated by the required hydrostatic pressure needed to control the well, and may be achieved by the amount and type of salt dissolved within the composition (resulting from the brine, etc). The densities of the thermal insulating compositions of the invention are controlled by operational considerations such as additives to the fluids, hydration time of viscosifier, and requirements for low crystallization temperatures (both true crystallization temperature (TCT) and pressure crystallization temperature (PCT). Densities to 13.0 pounds per gallon have been evidenced for the crosslinked thermal insulating compositions. Since no suspended solids are incorporated into the crosslinked insulating fluid system, settling of solids is not an issue.

The thermal insulating composition of the invention may be produced in shore-based facilities, transported to, and pumped from marine well-servicing boats into riser annuli. This provides a convenient means to blend, temporarily store, and then pump large quantities of fluid into the wellbore and riser annuli, without using rig tanks.

The thermal insulating composition of the invention further offers environmental benefits since no oil sheen will be produced if the composition is spilled since the composition is oil-free. Further, while the fluid compositions vary according to specific well conditions, the components of the composition are environmentally friendly especially since the composition is solids-free.

The composition of the invention may serve a dual purpose. First, they serve to prevent heat transfer/buildup in the outer annuli. Second, they serve to retain heat within the produced hydrocarbons. The compositions further provide lower viscosity at high shear rate to facilitate the fluid placement.

In the crosslinked thermal insulating compositions of the invention, an additive may be used to immobilize water/solvent in a variety of conditions. Since free fluid convection is due to the movement of water/solvent, immobilization of the fluid solvent can reduce or eliminate undesired free convection. See FIG. 1.

Other additives commonly used in the production of hydrocarbons from subterranean formations can be incorporated into these insulating formulations and include buffers, biocides and/or corrosion inhibitors.

It is important that the compositions are formulated to have an appropriate low crystallization temperature for the adverse conditions of deep water. The crosslinked insulating compositions have low pressure crystallization temperatures significantly less than 30° F. at 10,000 psi.

In deepwater applications, the crosslinked insulating fluid system of the invention is compatible with other polymer components in the wellbore, such as the bundle-carrier mechanism for communication with downhole devices. The compositions of the invention exhibit very low volume swell and very small change in mechanical strength over a period of time at application temperatures.

The following examples will illustrate the practice of the present invention in a preferred embodiment. Other embodiments within the scope of the claims herein will be apparent to one skilled in the art from consideration of the specification and practice of the invention as disclosed herein. All parts are given in terms of weight units except as may otherwise be indicated. It is intended that the specification, together with the example, be considered exemplary only, with the scope and spirit of the invention being indicated by the claims which follow.

EXAMPLES

Example 1

Example 1 Examines the Rheology of a Crosslinked Insulating Fluid 3 g of carboxymethyl hydroxypropyl guar (CMHPG) was added to 350 milliliters of sodium bromide brine which consists of water, propylene glycol (25 volume %), and sodium bromide salt (density=1.08 g/ml, or 9 pound/gallon) under rapid agitation.

After hydrating the mixture by a mechanical stirrer for 30 minutes, the pH was adjusted to about 9.5 with sodium hydroxide. Zirconium lactate crosslinker was added in an amount of 0.3 weight % based on the total weight of the aqueous solvent and the solution was mixed until it was fully crosslinked.

Thereafter, a 40 milliliter sample of crosslinked gel was placed into a Fann 50C viscometer cup. The cup was then placed on a Fann 50C viscometer and pressured to about 200 psi (14 kg/cm$^2$) with nitrogen. The sample was sheared at 450 sec$^{-1}$ for 2 minutes, followed by a rate sweep using 105, 85, 64, and 42 sec$^{-1}$ for about 2 minutes. The oil bath temperature was pre-set to 120° F. (49° C.) and the bath was raised to submerge the sample cup. The rate sweep was repeated every 30 minutes, and the interim rate between sweeps was 105 sec$^{-1}$. The stresses associated to each rate used in the sweep together with the rates were used to calculate the power law indices n and K; n refers to flow behavior index and K refers to consistency index set forth in the American Petroleum Institute's Bulletin RP-39. The fluid viscosity was then calculated by using the n and K values.

TABLE 1

Viscosity of the Crosslinked Insulating Fluid at Different Shear Rate at 120° F.

| Time Minute | Temperature ° F. | n | K mPa · s$^n$ | Rate 1 40/second Viscosity 1 CentiPoise | Rate 2 100/second Viscosity 2 CentiPoise | Rate 3 170/second Viscosity 3 CentiPoise |
|---|---|---|---|---|---|---|
| 2.1 | 121 | 0.6003 | 0.43312 | 4747 | 3291 | 2662 |
| 34.1 | 121 | 0.4704 | 0.73416 | 4983 | 3067 | 2316 |
| 66.1 | 121 | 0.3877 | 1.05673 | 5287 | 3017 | 2180 |

Example 2

This Example Illustrates Crosslinking Delay Time with No Retarder Present and Thermal Stability at 180° F.

3 g of carboxymethyl hydroxypropyl guar (CMHPG) was added to 350 milliliters of sodium bromide brine which consists of water, propylene glycol (25 volume %), and sodium bromide salt (density=1.08 g/ml, or 9 pound/gallon) under rapid agitation.

After hydrating the mixture by a mechanical stirrer for 30 minutes, the pH was adjusted to about 9.5 with sodium hydroxide. Zirconium lactate crosslinker was added in an amount of 0.3 weight % based on the total weight of the aqueous solvent. The crosslinking delay time was monitored from the time of adding crosslinker to the time when vortex is closed.

Thereafter, the crosslinked gel was placed in a static oven at 180° F. The status of the gel was checked after 60 days and 150 days and the results set forth in Table 2.

TABLE 2

| Retarder | Crosslinking time. | 60 days | 150 days |
|---|---|---|---|
| No | Instant | G | G |

G: gel,
T: thin,
B: broken

Example 3

This Example Illustrates Crosslinking Delay Time with a Retarder Present and Thermal Stability at 180° F.

3 g of carboxymethyl hydroxypropyl guar (CMHPG) was added to 350 milliliters of sodium bromide brine which consists of water, propylene glycol (25 volume %), and sodium bromide salt (density=1.08 g/ml, or 9 pound/gallon) under rapid agitation.

After hydrating the mixture by a mechanical stirrer for 30 minutes, the pH was adjusted to about 9.5 with sodium hydroxide. Retarder HR34-1 was added with concentrations of 3 gallon/barrel and 4 gallon/barrel, respectively (this retarder was obtained from Benchmark Research and Technology, Inc; sample number HR34-1). Then, zirconium lactate crosslinker was added in an amount of 0.3 weight % based on the total weight of the aqueous solvent. The crosslinking delay time was monitored from the time of adding crosslinker to the time when vortex is closed.

Thereafter, the crosslinked gel was placed in a static oven at 180° F. The status of the gel was checked after 60 days and 150 days and the results provided in Table 3.

TABLE 3

| Retarder, HR34-1 | Crosslink time. (room temperature) | 60 days | 150 days |
|---|---|---|---|
| 4 gpb | >12 hrs | G | G |
| 3 gpb | <12 hrs | G | G |

G: gel,
T: thin,
B: broken

Example 4

This Example Illustrates Crosslinking Delay Time with Mannitol as Retarder Present and Thermal Stability at 180° F.

Example 3 was repeated, except that mannitol was applied as retarder with concentrations of 3 pound/barrel, 2 pound/barrel, and 1 pound/barrel. The results are provided in Table 4 below.

TABLE 4

| Retarder, Mannitol | Crosslink time. (room temperature) | 60 days | 150 days |
|---|---|---|---|
| 3 ppb | >5 hrs | G | G |
| 2 ppb | >2 hrs | G | G |
| 1 ppb | ~20 minutes | G | G |

G: gel,
T: thin,
B: broken

Example 5

This Example Illustrates Crosslinking Delay Time with Sorbitol as Retarder and Thermal Stability at 180° F.

Example 4 was repeated, except that sorbitol was applied as retarder with concentrations of 3 pound/barrel, 2 pound/barrel, and 1 pound/barrel. The results are provided in Table 5 below.

TABLE 5

| Retarder, Sorbitol | Crosslink time. (room temperature) | 60 days |
|---|---|---|
| 3 ppb | >12 hrs | G |
| 2 ppb | >12 hrs | G |
| 1 ppb | >12 hrs | G |

G: gel,
T: thin,
B: broken

Example 6

This Example Examines the Convection Rate of Crosslinked vs. Non-Crosslinked Insulating Fluid 3 g of carboxymethyl hydroxypropyl guar (CMHPG) was added to 350 milliliters of sodium bromide brine which consisted of water, propylene glycol (25 volume %), and sodium bromide salt (density=1.08 g/ml, or 9 pound/gallon) under rapid agitation.

After hydrating the mixture by a mechanical stirrer for 30 minutes, 0.5 ml of blue food color was added and the pH was adjusted to about 9.5 with sodium hydroxide. Zirconium lactate crosslinker was added in an amount of 0.3 weight % based on the total weight of the aqueous solvent and the solution was mixed until it was fully crosslinked.

Similarly, a crosslinked fluid of pink color was prepared with the same chemical compositions except a pink food color was used as indicator.

The equipment for measuring convection rate consisted of two concentric glass tubes with the annulus sealed. Cold water (770° F.) was flowed through Tygon® tubing that was wrapped around the outer glass tube and hot water (170° F.) was flowed through the inner glass tube. The annulus was filled halfway with blue colored crosslinked insulating fluid in the bottom, and halfway with pink colored crosslinked insulating fluid on top.

Free convection is fluid motion caused by the variation of temperatures across the annulus. When convection occurs, fluid close to the hot inner glass tube would rise while fluid close to the cold outer glass tube would descend. Therefore, the convection rate could be calculated by measuring the migrated distance of the colored fluid from the initial interface of these two different colored fluids at a given time. The convection rates on various insulating fluids are reported in the graph set forth in FIG. 1.

Example 7

This Example Evaluates Crosslinked Insulting Fluids by Laboratory Wellbore Heat Flow Modeling The thermal insulating properties of the crosslinked thermal insulating fluid was evaluated in a laboratory-sized heat transfer apparatus to determine the thermal effectiveness of these fluids. The heat transfer apparatus consisted of three concentric aluminum pipes sealed by two flanges. Hot fluid at constant temperature was circulated in the innermost pipe, while cold fluid at constant temperature was circulated in the outermost annulus. The test insulating-fluid was contained in the packer annulus between the hot and cold reference fluids. The top and bottom of the apparatus were insulated to assure that heat flow was in the radial direction. Hot water entered the innermost pipe at the bottom and left the pipe at the top at approximately 1 gallon/minute to provide a hot surface at the inner-wall of the packer annulus. The cold water was fed into the outside pipe of the heat transfer apparatus with a flow rate of 3 gallon/minute to provide a cold wall annulus adjacent to the packer annulus. The test insulating-fluid remained static in the packer annulus. Thermocouples were positioned on the inner-wall (hot surface) and outer-wall (cold surface) of the annulus, and at the inlet and outlet ports for the hot and cold flowing water.

Figure 2:
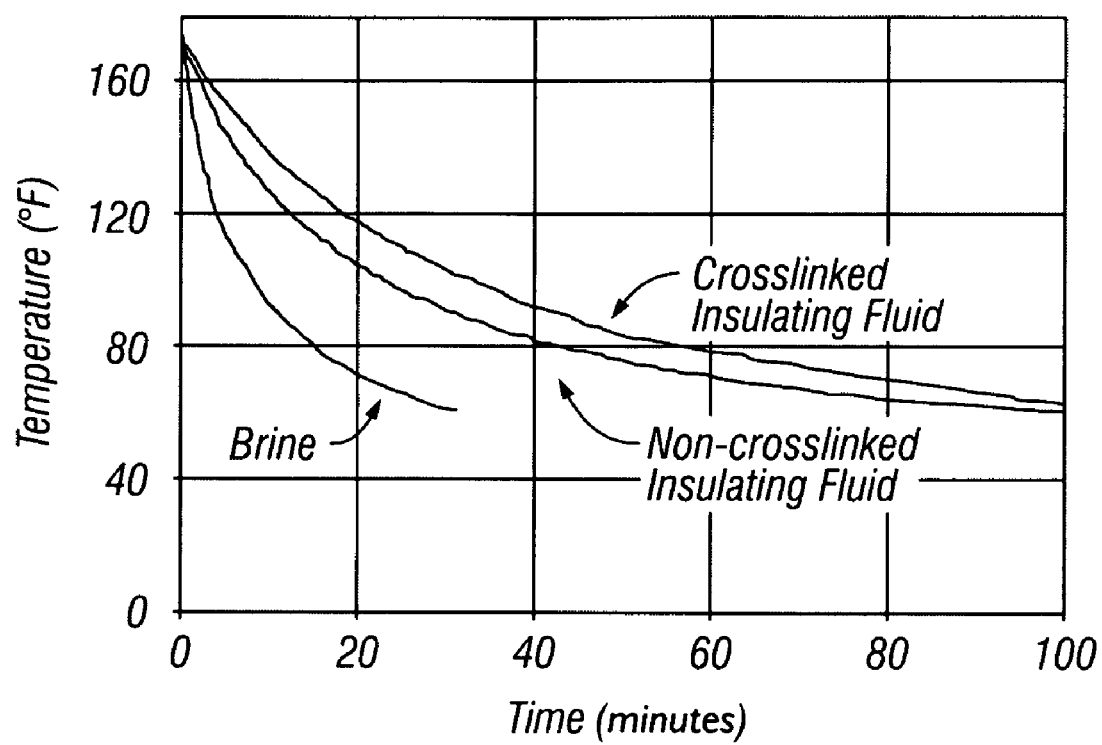
FIG. 2 illustrates the cool down results of a crosslinked insulating fluid within the invention versus a non-crosslinked insulating fluid of the prior art, as discussed below in Example 7.

During the test, hot water and cold water temperatures were set at 180° F. and 50° F., respectively. After thermal equilibrium was achieved (2 to 3 hours) for a given test, hot water flow was stopped and all hot water valves were closed. Cool down data was collected until the hot water temperature dropped below 60° F. FIG. 2 illustrates the cool down results for insulting fluids in comparison with water (brine). Taking cool-down to 90° F. for example, it took 12 minutes to drop to 90° F. when the insulating material was water (brine). However, 32 and 40 minutes were required for non-crosslinked insulating fluid and crosslinked insulating fluid, respectively. Crosslinked insulating fluids were found to be 25 percent more effective than non-crosslinked insulating fluids and three times more effective than water (brine).

From the foregoing, it will be observed that numerous variations and modifications may be effected without departing from the true spirit and scope of the novel concepts of the invention.

What is claimed is:

1. A method for enhancing the thermal insulation of a production tubing in or transfer pipe from a wellbore from which hydrocarbons are produced, wherein the production tubing or transfer pipe is surrounded by at least one annuli, comprising:
    pumping into the at least one annuli a fluid comprising water and/or brine, a crosslinkable viscosifying polymer, a crosslinking agent, and optionally a set retarder;
    maintaining the fluid in contact with the at least one annuli for a time sufficient to effectuate crosslinking of the crosslinkable viscosifying polymer with the crosslinking agent; and
    preventing heat transfer and/or heat buildup in the at least one annuli while retaining heat within the produced hydrocarbons.

2. The method of claim 1, wherein the crosslinkable viscosifying polymer is a polysaccharide or a homo-, block or random polymer containing vinyl alcohol, acrylate, pyrrolidone, 2-acrylamido-2-methylpropane sulfonate, or acrylamide units.

3. The method of claim 2, wherein the polysaccharide is cellulose, starch, galactomannan gum, xanthan, succinoglycan or scleroglucan or a derivative thereof.

4. The method of claim 3, wherein the polysaccharide is alkylcellulose, hydroxyalkyl cellulose, alkylhydroxyalkyl cellulose, carboxyalkyl cellulose derivative, guar gum, hydroxypropyl guar, or carboxymethylhydroxypropyl guar.

5. The method of claim 4, wherein the polysaccharide is methyl cellulose, hydroxyethyl cellulose, hydroxypropyl cellulose, hydroxybutyl cellulose, hydroxyethylmethyl cellulose, hydroxypropylmethyl cellulose, hydroxybutylmethyl cellulose, methylhydroxyethyl cellulose, methylhydroxypropyl cellulose, ethylhydroxyethyl cellulose, carboxyethylcellulose, carboxymethylcellulose or carboxymethylhydroxyethyl cellulose.

6. The method of claim 1, wherein the crosslinking agent comprises at least one member selected from the group of borate-releasing compounds, a source of transition metal ions, and a source of alkaline earth metal ions.

7. The method of claim 6, wherein the crosslinking agent is boric acid, boric oxide, alkali metal borate, alkaline metal borate, polymeric borate compounds, or a mixture thereof.

8. The method of claim 1, wherein the crosslinking agent is a complex compound of zirconium or titanium in a +4 valence state, or zinc in a +2 valence state.

9. The method of claim 1, wherein the crosslinking agent is a compound of calcium and/or magnesium in a +2 valence state, or a mixture thereof.

10. The method of claim 1, wherein the fluid further contains an additive selected from the group consisting of buffers, biocides and corrosion inhibitors.

11. The method of claim 1, wherein the fluid comprises carboxymethyl hydroxypropyl guar, brine and a metal crosslinking agent.

12. The method of claim 1, wherein the fluid contains a set retarder.

13. The method of claim 12, wherein the set retarder is selected from the group consisting of hydroxycarboxylic acids, glucoheptonates, lignin, lignin sulfonates, gluconates, phosphonates, and sugars, or salts thereof.

14. The method of claim 13, wherein the set retarder is selected from the group consisting of allitol, altritol, arabinitol, dulcitol, iditol, mannitol, perseitol, ribitol, rythritol, sorbitol, threitol and xylitol.

15. The method of claim 1, wherein crosslinking of the crosslinkable viscosifying polymer and crosslinking agent is delayed until the fluid is pumped into the at least one annuli and further wherein the amount of set retarder in the fluid is from 0 to about 4 weight percent.

16. The method of claim 1, wherein the composition is prepared on the surface and then added to the at least one annuli.

17. A method for reducing convection flow velocity in at least one riser annuli surrounding a production tubing, comprising:
introducing into the at least one riser annuli a riser fluid comprising water and/or brine, a viscosifying polymer, a crosslinking agent, and optionally, a set retarder; and
maintaining the fluid in the at least one riser annuli for a time sufficient to effectuate crosslinking of the viscosifying polymer with the crosslinking agent and thereby immobilize the water and/or brine in the at least one annuli, thereby reducing convection flow velocity.

18. The method of claim 17, wherein the fluid contains a set retarder.

19. The method of claim 18, wherein the set retarder is selected from the group consisting of hydroxycarboxylic acids, glucoheptonates, lignin, lignin sulfonates, gluconates, phosphonates, and sugars, or salts thereof.

20. The method of claim 19, wherein the set retarder is selected from the group consisting of allitol, altritol, arabinitol, dulcitol, iditol, mannitol, perseitol, ribitol, rythritol, sorbitol, threitol and xylitol.

21. A method of controlling heat transfer from a production tubing or transfer pipe to one or more surrounding annuli and the environment, comprising:
adding to the one or more surrounding annuli a fluid comprising water and/or brine, a viscosifying polymer, a crosslinking agent, a polyol, and optionally a set retarder; and
maintaining the fluid in contact with the at least one annuli for a time sufficient to effectuate crosslinking of the viscosifying polymer and prevent heat transfer or build-up in the one or more surrounding annuli.

22. The method of claim 21, wherein the polyol is a glycerol, glycol or a polyglycol.

23. The method of claim 22, wherein the glycol is ethylene glycol or propylene glycol.

24. The method of claim 21, wherein the composition is prepared on the surface and then added to the one or more surrounding annuli.

25. The method of claim 21, wherein the viscosifying polymer is a polysaccharide or a homo-, block or random polymer containing vinyl alcohol, acrylate, pyrrolidone, 2-acrylamido-2-methylpropane sulfonate, or acrylamide units.

26. The method of claim 25, wherein the polysaccharide is cellulose, starch, galactomannan gum, xanthenes, succinoglycan or scleroglucan or a derivative thereof.

27. The method of claim 21, wherein the crosslinking agent comprises at least one member selected from the group of borate-releasing compounds, a source of transition metal ions, a source of alkaline earth metal ions, a complex compound of zirconium or titanium in a +4 valence state and a complex compound of zinc in a +2 valence state.

28. The method of claim 21, wherein the fluid contains a set retarder.

29. A method for enhancing the thermal insulation of a transfer pipe, wherein the transfer pipe is surrounded by at least one annuli, comprising:
pumping into the at least one annuli a fluid comprising water and/or brine, a crosslinkable viscosifying polymer, a crosslinking agent, and optionally a set retarder and/or polyol; and
maintaining the fluid in contact with the at least one annuli for a time sufficient to effectuate crosslinking of the crosslinkable viscosifying polymer with the crosslinking agent; and
reducing heat loss from the transfer pipe.

30. The method of claim 29, wherein the crosslinkable viscosifying polymer is a polysaccharide or a homo-, block or random polymer containing vinyl alcohol, acrylate, pyrrolidone, 2-acrylamido-2-methylpropane sulfonate, or acrylamide units.

31. The method of claim 30, wherein the polysaccharide is cellulose, starch, galactomannan gum, xanthan, succinoglycan or scleroglucan or a derivative thereof.

32. The method of claim 31, wherein the polysaccharide is alkylcellulose, hydroxyalkyl cellulose, alkylhydroxyalkyl cellulose, carboxyalkyl cellulose derivative, guar gum, hydroxypropyl guar, or carboxymethylhydroxypropyl guar.

33. The method of claim 32, wherein the polysaccharide is methyl cellulose, hydroxyethyl cellulose, hydroxypropyl cellulose, hydroxybutyl cellulose, hydroxyethylmethyl cellulose, hydroxypropylmethyl cellulose, hydroxybutylmethyl cellulose, methylhydroxyethyl cellulose, methylhydroxypropyl cellulose, ethylhydroxyethyl cellulose, carboxyethylcellulose, carboxymethylcellulose or carboxymethylhydroxyethyl cellulose.

34. The method of claim 29, wherein the fluid comprises carboxymethyl hydroxypropyl guar, brine and a metal crosslinking agent.

35. The method of claim 29, wherein the crosslinking agent comprises at least one member selected from the group of borate-releasing compounds, a source of transition metal ions, a source of alkaline earth metal ions, a complex compound of zirconium or titanium in a +4 valence state and a complex compound of zinc in a +2 valence state.

36. The method of claim 35, wherein the crosslinking agent is boric acid, boric oxide, alkali metal borate, alkaline metal borate, polymeric borate compounds, a compound of calcium and/or magnesium in a +2 valence state or a mixture thereof.

37. The method of claim 29, wherein the fluid contains a set retarder.

38. The method of claim 37, wherein the set retarder is selected from the group consisting of hydroxycarboxylic acids, glucoheptonates, lignin, lignin sulfonates, gluconates, phosphonates, and sugars, or salts thereof.

39. The method of claim 29, wherein the crosslinking of the viscosifying polymer and crosslinking agent is delayed until after the fluid is pumped into the at least one annuli.

40. The method of claim 29, wherein the fluid contains a polyol.

* * * * *